United States Patent
Kowles (10) Patent No.: US 12,189,968 B1
(45) Date of Patent: Jan. 7, 2025

(54) RECOVERING MECHANICAL ENERGY FROM DATA STORAGE DEVICES

(71) Applicant: Amazon Technologies, Inc., Seattle, WA (US)

(72) Inventor: Andrew Michael Kowles, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 100 days.

(21) Appl. No.: 18/123,931

(22) Filed: Mar. 20, 2023

Related U.S. Application Data (62) Division of application No. 17/108,811, filed on Dec. 1, 2020, now abandoned.

(51) Int. Cl.
| | |
|---|---|
| G06F 1/28 | (2006.01) |
| G06F 1/26 | (2006.01) |
| G06F 1/30 | (2006.01) |
| G06F 3/06 | (2006.01) |

(52) U.S. Cl.
CPC ............ *G06F 3/0625* (2013.01); *G06F 1/26* (2013.01); *G06F 1/28* (2013.01); *G06F 1/30* (2013.01); *G06F 3/0653* (2013.01)

(58) Field of Classification Search
CPC ................ G06F 1/26; G06F 1/28; G06F 1/30
See application file for complete search history.

(56) References Cited

U.S. PATENT DOCUMENTS

| | | | |
|---|---|---|---|
| 6,725,397 B1 * | 4/2004 | Emberty | G06F 12/0804 714/24 |
| 9,889,834 B2 * | 2/2018 | Crombez | F02N 11/084 |
| 9,904,486 B2 | 2/2018 | El-Batal et al. | |
| 2010/0165811 A1 * | 7/2010 | Bonvin | G11B 19/047 |
| 2011/0133560 A1 | 6/2011 | Yamashita et al. | |
| 2012/0079321 A1 | 3/2012 | Williams | |
| 2012/0151162 A1 | 6/2012 | Trantham et al. | |
| 2014/0185156 A1 | 7/2014 | Kardach et al. | |
| 2016/0011914 A1 | 1/2016 | Bohn et al. | |
| 2016/0156191 A1 | 6/2016 | Takanaka | |
| 2020/0110454 A1 | 4/2020 | Yang | |
| 2020/0154594 A1 | 5/2020 | Matthews et al. | |
| 2020/0272367 A1 | 8/2020 | Mendonsa et al. | |

* cited by examiner

*Primary Examiner* — Stefan Stoynov
(74) *Attorney, Agent, or Firm* — Klarquist Sparkman, LLP (57) ABSTRACT

Systems and methods are disclosed for harvesting electrical energy from mechanical components of hard disk drives (HDDs) in a data storage system and propagating the electrical energy to devices outside of the HDDs. A power distribution board (PDB) may be coupled to a plurality of HDDs and used to detect a voltage drop on a connection between the PDB and the HDDs indicative of a power loss condition, and, in response, enable the flow of electrical energy from the HDDs to the PDB. The electrical energy from the HDDs may be converted for use by the PDB and/or distribution to other components of the data storage system.

8 Claims, 8 Drawing Sheets

RECOVERING MECHANICAL ENERGY FROM DATA STORAGE DEVICES

CROSS-REFERENCE TO RELATED APPLICATION

This a divisional of U.S. application Ser. No. 17/108,811, filed Dec. 1, 2020, which application is incorporated herein in its entirety.

BACKGROUND

Hard disk drives (HDDs) are electro-mechanical data storage devices that store digital data, typically on rotatable platters. HDDs utilize electric motors to spin up the platters and to position read/write head assemblies that interface with the platters to read and write the digital data. Accordingly, during operation, HDDs are connected to a power source to enable these electro-mechanical processes. For example, HDDs can be used for large-form data storage implementations, such as those found in data centers or other data storage facilities. In such examples, the HDDs may be interconnected to one another, as well as to one or more centralized power and/or control circuits. Although the HDDs consume power to spin up the platters, the rotational movement also creates mechanical inertia upon spinning down the HDDs (e.g., at the end of a read/write operation in cold storage applications, or after a threshold period of inactivity in other applications) that can be used to generate electrical energy. However, current configurations may limit the propagation of such generated electrical energy.

DETAILED DESCRIPTION

As described above, the operation of an HDD (e.g., the spinning up and down of the platters of the HDD) may result in mechanical inertia that is able to be converted into electrical energy. In some examples, HDDs may be configured to harvest this electrical energy locally to enable the HDDs to remain at least partially powered during sudden power loss of an external power supply. For example, if an HDD is part of a cluster of computing devices, such as a server or rack of a data center, the HDD may be primarily powered by a power supply circuit of the server, rack, and/or other centralized component of the data center. However, if power loss from the primary supply is detected, the HDD may be configured to utilize mechanical inertia from its spinning drive power itself long enough to cleanly shut down operation.

While the above-described operation enables the HDD to increase its reliability and performance, the limited application of the energy (e.g., only during power loss events detected by the HDD) may result in an excess of harvested energy that is left unused. For example, the HDD may power up and down during times when a power outage does not occur, and also may generate more energy than needed to shut itself down when a power outage does occur. In either case, any additional mechanical inertia may be wasted.

The disclosure provides example approaches to harvest mechanical energy from HDDs in a multi-HDD system and feed the harvested energy throughout the system. In this way, while the harvested electrical energy may be used locally by the HDD that generates the mechanical energy as described above, additional harvested electrical energy may be used by other components of a data storage system (e.g., components outside of the HDD that is generating the mechanical energy), increasing the recovery rate and usefulness of generated mechanical energy. The described approaches may include control circuits and routines configured to route the harvested energy to various portions of a multi-HDD system, such as a Just a Bunch of Disks (JBOD) or other data storage system. The disclosed systems and methods may also be configured to be used in cold storage platforms, which may experience significantly more HDD spin ups and spin downs than other storage systems (e.g., other storage systems that maintain HDDs in active, "spun up" state for longer).

Figure 1:
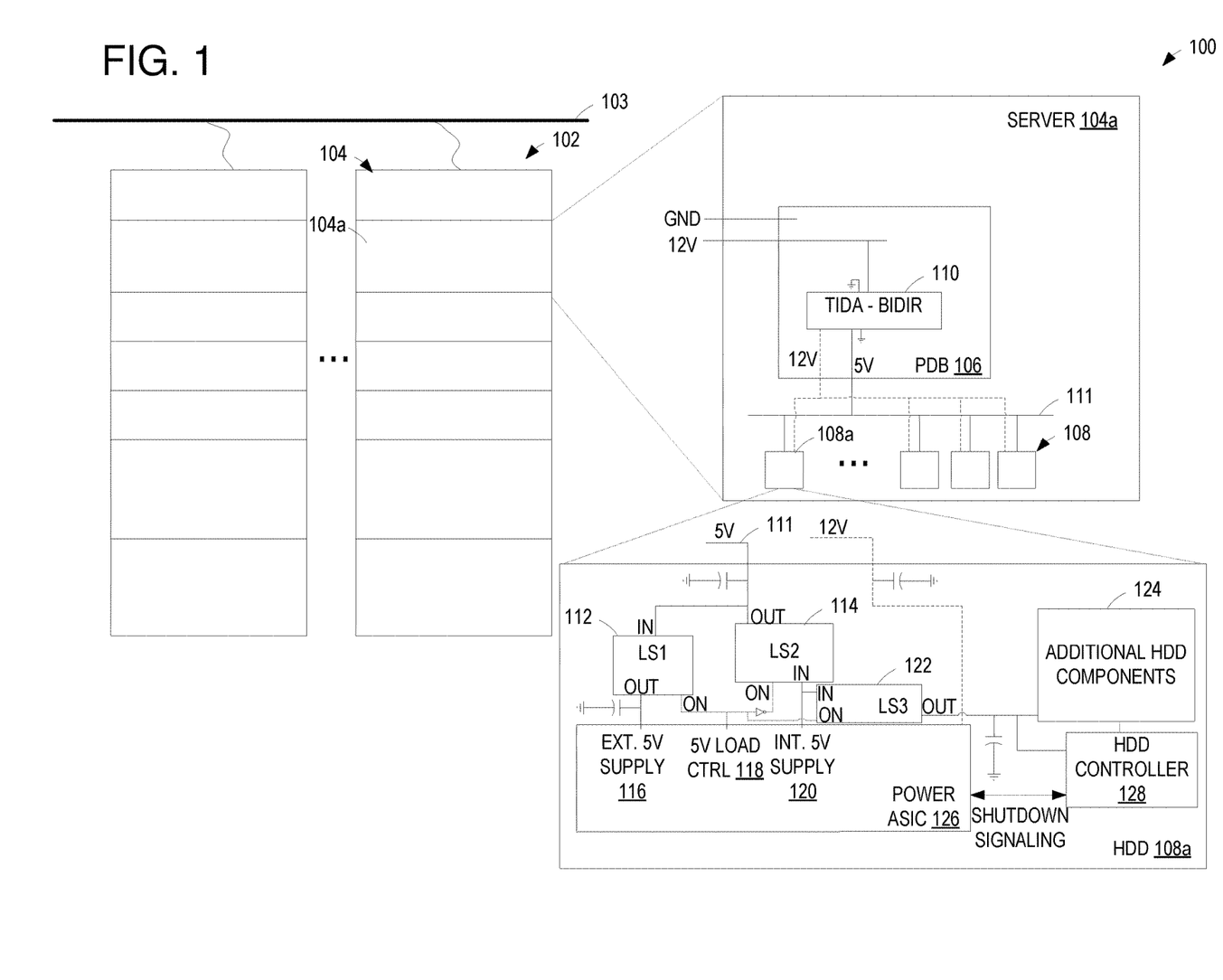
FIG. 1 is an example system diagram showing various components of an example data storage environment in which energy may be harvested and propagated from hard disk drives to other components of the system.

FIG. 1 shows an example data storage system 100 including a plurality of racks 102 connected to a power bus 103 (e.g., each rack may use a suitable amount of power from the power bus, such as 7 kW, 15 kW. 25 KW, etc.). Each rack 102 may include a plurality of servers 104 (including server 104a), and each server 104 may include a power distribution board (PDB) 106 and a plurality of HDDs 108 (e.g., including HDD 108a). It is to be understood that the number of racks, servers, and HDDs shown are exemplary, and any suitable number and/or distribution of components may be utilized in data storage system 100 without departing from the scope of this disclosure. Additionally, examples of voltages on voltage supply lines and power supply values/configurations are provided for illustrative purposes and the disclosure is not limited to applications using these example voltage values and power supply values/configurations.

The PDB 106 may be generally configured to use power from the data center (e.g., the bus 103) to establish voltage sources at appropriate voltage levels for various components of the server. In other systems, PDBs may also include capacitive elements to store energy for use during power loss events (e.g., to allow components of the server to safely shut down in the event of power loss at the server-level, rack-level, and/or data center-level). As will be described in more detail below, the described system may be used to remove or reduce the number/size of capacitive elements in the PDB by instead propagating energy harvested from the HDDs throughout the rack/server to provide power to allow components to complete safe shutdown procedures during unexpected power loss events.

The PDB 106 includes a bidirectional (e.g., buck out, boost in) DC-to-DC switching converter 110 that is configured to supply voltage (e.g., a 5 V supply in the illustrated example) on bus 111 for HDDs 108. Optionally, the PDB 106 may condition the illustrated incoming 12 V and correspondingly supply this conditioned 12 V output to the HDDs. In other examples, one or more additional or alternative voltage lines may be output by the PDB 106.

As described above, each HDD 108 is connected to the 5 V supply line 111 (and optionally a 12 V supply line) supplied by the PDB 106. A detailed view of an example HDD 108a is shown in FIG. 1. The 12 V supply is connected to a power application-specific integrated circuit (ASIC) 126, which may serve as a controller for one or more of the described power operations. For example, the power ASIC 126 may serve as an arbiter controlling whether the HDD is being powered by the external supply (e.g., supplied by the PDB) or whether the HDD is supplying internally-generated voltage to the PDB, as will be described in more detail below. In some examples, the power ASIC 126 may be implemented as and/or include a state machine and/or one or more microcontrollers configured to perform the operations described herein. As described above, the 5 V and 12 V voltage supply lines are shown as an illustrative example, and other voltage line values and/or configurations may be used without departing from the scope of this disclosure. For example, the 5 V and/or 12 V supply lines may instead provide a different voltage supply value. As another example, the connections described herein relating to the 5 V supply line 111 may instead be applied to the 12 V voltage supply line and/or the 5 V and 12 V supply line connections may be swapped with one another.

The 5 V supply line 111 is connected to an input to a first load switch, LS1 112 and to an output of a second load switch, LS2 114. The output of the first load switch LS1 112 is connected to an external 5V supply input/output 116 of the power ASIC 126. The enable ("on") inputs of the first and second load switches are connected to a 5 V load control signal 118 (e.g., an active "high" logical signal) of the power ASIC 126, where the output of the 5 V load control signal is inverted before being supplied to the second load switch LS2 114. The input of the second load switch LS2 114 is connected to an internal 5 V supply input/output 120 of the power ASIC 126. In this way, the load control circuit 118 controls the directionality of current flow through the load switches.

For example, when enabled (e.g., the output of the load control signal 118 is a logical high/1), the LS1 112 is enabled, causing current to flow though LS1 from the input to the output (e.g., allowing for external powering of the system, using the external 5V supply input 116 of the power ASIC 126). Likewise, in the above-described condition, the LS2 114 is disabled (due to the inversion of the 5 V load control signal prior to input to LS2), such that current does not flow through LS2.

In the alternative condition, when the output of the 5 V load control is logical low/0, the LS1 112 is disabled, preventing current from flowing through it, while the LS2 114 is enabled, allowing current to flow from the internal 5 V supply input/output 120 of the power ASIC 126 to the 5 V power rail 111 at the output of the LS2 114. As will be described in more detail with respect to FIG. 2, the internal 5 V supply input/output 120 may supply voltage generated internally by the HDD.

The 5 V load control circuit 118 is also connected to the enable ("on") input of a third load switch, LS3 122. The input of the LS3 122 is connected to the internal 5 V supply 120 and the output of the LS3 122 is connected to additional components 124 of the HDD (e.g., memory, such as dynamic random-access memory [DRAM] and/or flash memory, memory interfaces, such as a serial peripheral interface [SPI] for NOR flash memory, sensors, motor controllers, etc.), which may further include and/or be in communication with an HDD controller 128 (e.g., a System on Chip [SoC], central processing unit, or other component configured to control operations of the HDD). In this way, the LS3 122 is used to control the distribution of power to the additional HDD components based on the output of the 5 V load control signal 118, such that the HDD components are only powered by the internal 5 V supply input/output 120 when power is being supplied from the 5 V rail 111. In this way, the LS3 122 may maximize HDD-generated voltage output to the PDB when such operation is performed by reducing (and ultimately eliminating) the siphoning of current to the additional HDD components. In alternative examples, the LS3 122 may be eliminated or configured differently (e.g., coupled to a different load control signal) to allow the additional HDD components to continue to be powered by the internal 5 V supply input/output 120 while the HDD is generating power for the PDB.

In order to control the LSs effectively, the 5 V load control signal 118 may be controlled to switch "off" or "low" based on a detection that voltage supplied to the HDD has dropped below a threshold level (e.g., a threshold level below the nominal approximately 5 V line voltage). For example, the load control signal 118 may be controlled by the power ASIC 126 and/or an associated detection circuit in communication with the power ASIC 126. The threshold level may be configured to account for the HDD shut down procedure that occurs responsive to a power outage event. For example, in order to shut down properly, an HDD may utilize power to control an actuator head to return to a docked position (e.g., to stop interfacing with the platters of the HDD). Subsequent operations may include performing data transfers using the HDD electronics to preserve state data, user data, etc. For example, current state information and current user information may be written to on-board non-volatile memory, such as FLASH memory, of the HDD. The performance of this shut down procedure may cause a predictable drop in voltage, such that the 5 V load control signal 118 may be controlled to switch from a default "high" state to a "low" state when voltage drops further below that level, indicating that the HDD has completed its shutdown routine after a power loss event.

In some examples, the power ASIC 126 may exchange shutdown signaling with an HDD controller 128 (e.g., a SoC, as described in more detail below with respect to FIG. 2) configured to orchestrate the above-described shutdown procedure. For example, the power ASIC 126 may be configured to provide a logic edge to the HDD controller 128 to signal that a shutdown is to occur based on the detection of the loss of power from the PDB as described above. The HDD controller 128 may provide a logic edge to the power ASIC 126 to indicate that the shutdown procedure has completed. Although illustrated as a single, multi-directional connection, it is to be understood that the shutdown signaling between the power ASIC 126 and the HDD controller 128 may be propagated via discrete hardware pins (e.g., the HDD controller 128 may have a non-maskable interrupt mapped to the shutdown signal pin from the power ASIC configured to trigger the shutdown responsive to a logical high being asserted on that pin).

Once the switch to the low state occurs, the power ASIC 126 may not perform further controls to change the 5 V load control signal 118 until a next power up event (e.g., where power is restored flowing from the PDB to the HDD via line 111), at which time the 5 V load control signal is reset to a "high" state. Further examples of conditions and responses in components of the HDD are described in more detail with respect to FIG. 3.

It is to be understood that FIG. 1 schematically shows connections between components, and these connections may be implemented in any suitable manner. For example, the HDDs and the backplane of the data storage systems described herein may use any suitable and/or compatible combination of connectors and storage interfaces, such as Serial Attached SCSI (SAS), Serial Advanced Technology Attachment (SATA), Non-Volatile Memory Express (NVMe), etc. In one non-limiting example, the HDDs and data storage backplane may combine SAS and SATA technology (e.g., SATA HDDs may be plugged into an SAS backplane), which would result in the presence of multiple spare pins available for pulling power off of the hard drive for use and/or distribution by the PDB to the data storage system. In another example, the HDDs and the backplane may utilize the same technology (e.g., SATA drives may be plugged into a SATA backplane, SAS drives may be plugged into an SAS backplane, NVMe drives may be plugged into an NVMe backplane, etc.). In still other examples, the data storage system may include multiple backplane/HDD pairings (e.g., one or more SAS backplanes that accept SATA and/or SAS drives and one or more SATA backplanes that accept SATA drives, etc.).

As described above, the HDD 108a may be configured with internal circuitry to detect a power loss condition and begin supplying power (harvested from mechanical energy from the platters and/or motors of the HDD 108a) back to the 5 V rail 111. The PDB 106 may be configured to detect this condition in order to trigger processes for distributing this HDD-provided power to other components of the server 104a and/or rack 102. For example, the PDB 106 may include and/or be connected to a sensor coupled between the PDB 106 and each HDD 108. During normal operation, the PDB 106 may have a high impedance connection to HDD 108a. However, during a power loss event, the connection between the PDB 106 and the HDD 108a becomes a sink, causing electrons to flow back to the PDB 106, which are detectable by the sensor. In this way, the same connection (e.g., pin of a connector) used to detect the power loss condition may also be used to convey power from the HDD to the PDB. The switching converter 110 in the PDB may be configured to alter operation responsive to detection of this event (the flow of current from the HDD to the PDB) in order to convert the energy from the HDD to useable energy for the rest of the data storage system.

Figure 2:
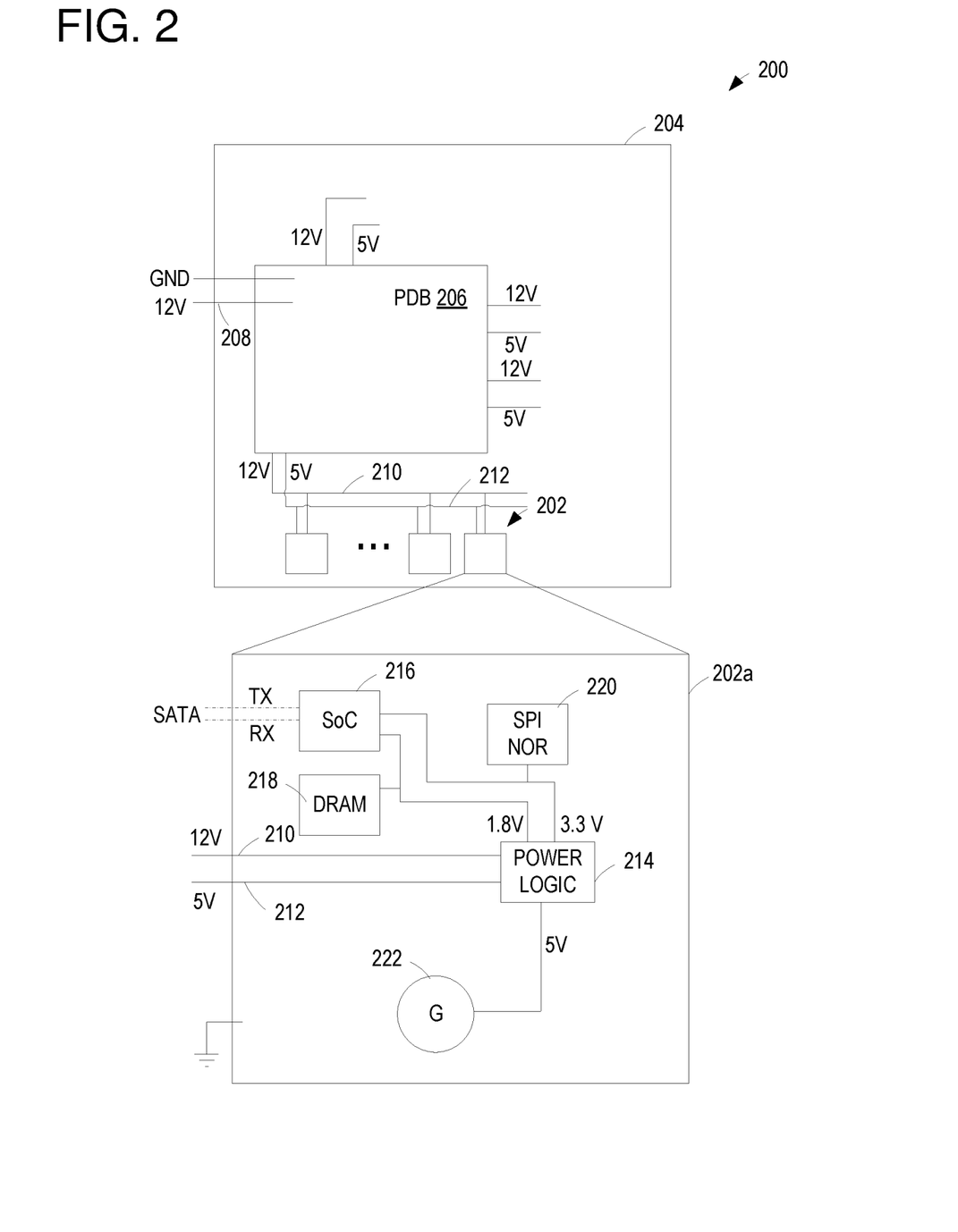
FIG. 2 is an example block diagram of components of a hard disk drive in a data storage environment, where the hard disk drive is capable of harvesting electrical energy from mechanical inertia of moving components of the hard disk drive.

FIG. 2 is a block diagram showing example components of an HDD 202a in a data storage system 200 that may be used to harvest energy from mechanical operation of the drive. In some examples, one or more of the components of HDD 202 may be included in the HDDs 108 of FIG. 1 in order to supply power (generated from the harvested energy) to the PDB 106 in a system power loss event. As noted with respect to FIG. 1 above, examples of voltages and other features, such as the number/type of illustrated components, connections, etc. in FIG. 2, are provided for illustrative purposes and the disclosure is not limited to applications using these example voltage values and configurations.

System 200 includes a server 204 of HDDs 202 that are connected to a PDB 206 for receiving power. For example, PDB 206 may be configured to convert and distribute power from an external power source of the data storage system (e.g., via a 12 V rail 208) to power the HDDs 202 (e.g., via 12 V rails 210 and 5 V rails 212). The power from the 12 V and 5 V rails are used by power logic 214 to convert the input and supply voltage to various HDD components. The power logic 214 may be an example of power ASIC 126 of FIG. 1 and may be implemented as and/or include one or more ASICs, microcontrollers and/or software running on a microcontroller(s)/microprocessor(s), programmable state machines, and/or other components configured to perform the operations described herein. For example, the power logic 214 provides a 1.8 V and a 3.3 V supply for use by the HDD system on chip (SoC) 216 that controls read and write operations via a SATA connection. The 1.8 V supply is also used by a dynamic random-access memory (DRAM) component 218, which may be used as operational memory for the HDD. The 3.3 V supply is also used by a Serial Peripheral Interface (SPI) NOR component 220, which may serve as flash memory for storing state data, user data, and other information during a shut down event of the HDD. The SoC 216, DRAM 218, and SPI NOR 220 are examples of the additional HDD components 124 of FIG. 1.

The power logic 214 is also connected to a generator 222. The generator 222 may be configured to generate electrical energy from the mechanical inertia of mechanical components of the HDD (e.g., the spinning platters and/or one or more motors of the HDD during spin up and spin down events). It is to be understood that additional power electronics and/or circuits may be included in the generator 222 or between the generator 222 and the power logic 214 to convert the mechanical energy to the 5 V supply voltage for use by the power logic 214. In this way, the power generated by the generator 222 may be used to power the components of the HDD to ensure a safe shut down in the event of a power loss on the main voltage rails 210 and 212. As described above, the generator 222 may be coupled to components of the HDD 108a of FIG. 1, such as the internal 5 V supply 120, to provide power that is able to be routed back to the PDB once the HDD shut down has been completed. For example, the 5 V supply line between generator 222 and power logic 214 of FIG. 2 may correspond to the internal 5 V supply input/output 120 of FIG. 1. In this way, the additional harvestable energy of the HDD is not lost, but rather distributed to other components in the data storage system.

Figure 3:
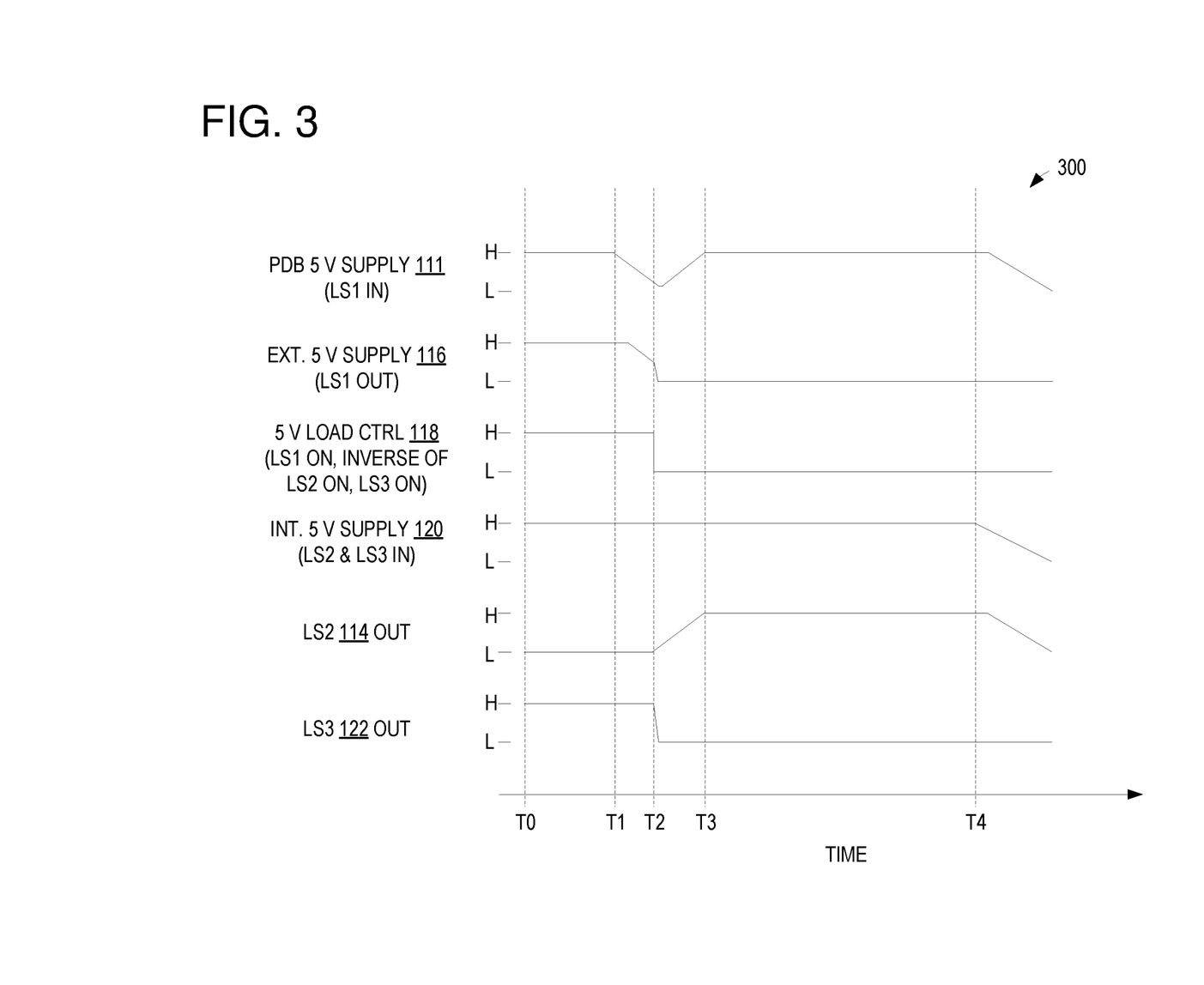
FIG. 3 is an example diagram showing states of signals and/or voltage lines corresponding to components of FIG. 1 over time.

FIG. 3 is an example timing diagram 300 showing example states of some of the inputs/outputs, supply lines, and signals illustrated in FIG. 1 relating to components of HDD 108a. In particular, the diagram 300 shows example voltage levels and/or logical values over time (e.g., of the PDB 5 V supply line 111, external 5 V supply input/output 116, 5 V load control signal 118, internal 5 V supply 120, output of LS2 114, and output of LS 3 122 of FIG. 1.

At time T0, the system is operating normally, with power being supplied to the HDD 108a from a main power supply through the PDB 106. Accordingly, at time T0, the PDB 5 V supply line 111 (which is connected to the IN port of LS1 112) is at a high level (e.g., within a threshold tolerance of the configured supply line voltage; 5 V in the illustrated example). The 5 V load control signal 118 is in a default "high" state at time T0 (e.g., a voltage level corresponding to a logical high level, which may be 5 V. 3.3 V. 3 V, 1.8 V, etc.), so the 5 V supply from line 111 is propagated through LS1 112, resulting in the external 5 V supply input/output 116 being held at a high level (e.g., within a threshold tolerance of 5 V in the illustrated example, or at 3.3 V. 1.8 V, or another targeted value in other examples). The internal 5 V supply input/output 120 is also at a high level (e.g., within a threshold tolerance of 5 V in the illustrated example), as the HDD is generating power internally from operation of the mechanical components of the HDD (e.g., as described above with respect to generator 222 of FIG. 2). However, as the high value of the 5 V load control signal 118 is inverted before being supplied to the "ON" input of LS2 (as shown in FIG. 1), LS2 is not enabled/activated and thus the output of LS2 is at a low level (e.g., approximately 0 V). LS3 is connected to the non-inverted 5 V load control signal, so remains switched on while the load control signal is on, and thus the LS3 output is high (e.g., within a threshold tolerance of a configured supply line voltage, such as 5 V, 3.3 V, 1.8 V, etc.) at time T0.

At time T1, a disruption in the main power supply for the data storage system and/or another event that causes a loss of power output from the PDB occurs. Accordingly, the voltage on PDB 5 V supply 111 begins dropping at T1, with the external 5 V supply 116 experiencing a corresponding (though slightly lagging) drop in voltage thereafter. The other signals/lines remain the same until time T2, where the voltage from the PDB drops to a threshold value, which triggers load control signal 118 to switch from high to low (e.g., a voltage corresponding to a logical low level, which may be 0 V). This switch of the load control signal 118 turns off LS1 and LS3, causing a swift drop in the voltage output of those components (e.g., external 5 V supply 116 and LS3 122 out) to a designated "low" value, such as 0 V. The switch of load control signal 118 also turns on LS2 at time T2, resulting in an increase in the voltage on LS2 114 out, as the internal 5 V supply 120 is allowed to pass through LS2.

As described above, the PDB 5 V supply line 111 starts decreasing as soon as the disruption in power supply from the PDB occurs at time T1. This decrease continues until the voltage supplied by LS2 is introduced, which causes the voltage on line 111 to increase correspondingly, as shown from shortly after time T2 until time T3, where the voltage reaches a high level (e.g., 5 V).

At time T4, the regenerative power from the HDD is expended, so the voltage on internal 5 V supply 120 begins decreasing, and the LS2 114 output and PDB 5 V supply line 111 correspondingly begin dropping, after a slight propagation delay, until a low level (e.g., 0 V) is reached. The supply/control lines may be maintained at the illustrated levels until such time as power is restored at the PDB. Responsive to such restoration, the 5 V load control signal may be reset, and the supply/control lines may appear once again as shown at time T0.

Figure 4:
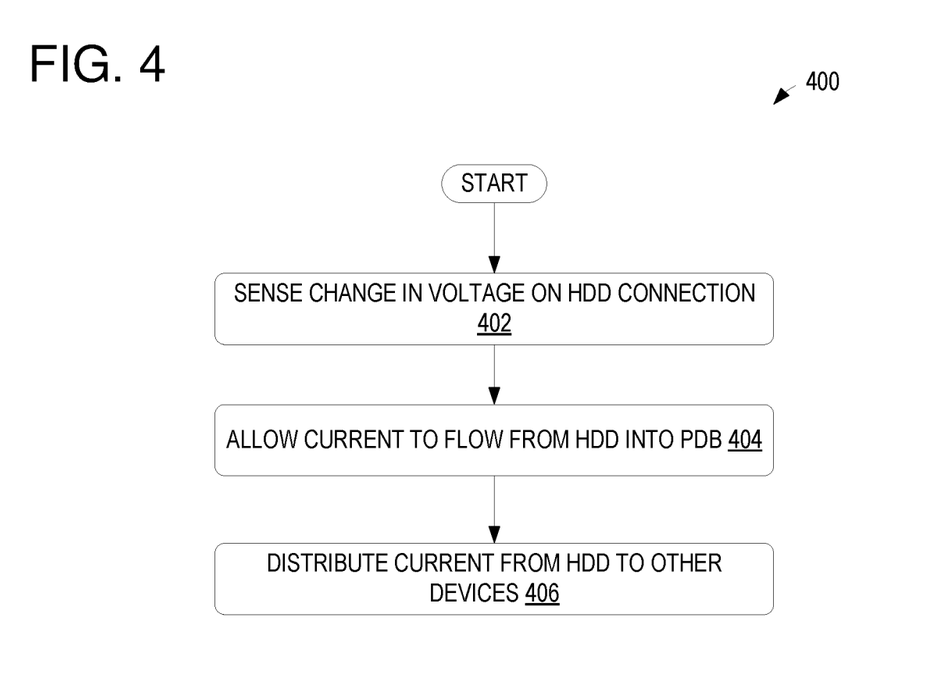
FIG. 4 is a flow chart of an example method of collecting and distributing power from hard disk drives to other components of a data storage system.

FIG. 4 is a flow chart of an example method 400 for harvesting and distributing energy from an HDD to other components of a data storage system. Method 400 may be performed using one or more of the components of FIG. 1 and/or FIG. 2 in some examples, such as the PDB 106 in coordination with the HDD 108a of FIG. 1. In some examples, method 400 may be performed by operation of passive circuit components in a PDB. However, it is to be understood that active circuitry and/or programming to achieve the operations of method 400 may be performed in other examples.

At 402, the method includes sensing a change in voltage on a connection between the PDB and the HDD. For example, the sensed change in voltage may correspond to a change in voltage that is above a threshold, which indicates that the voltage has dropped to a level that triggered a harvesting of electrical energy from mechanical inertia of the HDD and a shut down operation of the HDD. As described above, the HDD may include components configured to hold the voltage level of the connection to the PDB at a specified level, even in a power loss event, until such time as the HDD has completed a shut down operation (which may be configured based on a known amount of voltage loss that typically occurs during the shutdown operation, as described above).

At 404, the method includes allowing current to flow from the HDD to into the PDB. For example, as described above, one or more diodes may be passively configured to turn on when the voltage drops to below a threshold to allow the current to reverse direction and flow into the PDB. The time between operations 402 and 404 may depend on the characteristics of the HDD and its state.

At 406, the method includes distributing current from the HDD to other devices in the data storage system. For example, the PDB may convert the energy received via the HDD connection on which the voltage change was detected to power itself (e.g., an internal component of the PDB) and/or other components in the server, such as other HDDs that are connected to the PDB (e.g., for intra-server regeneration) and/or other components outside of the server (e.g., for inter-server regeneration). In some examples, the PDB may be in communication with a Baseboard Management Controller (BMC) of the data storage system (e.g., via a serial interface) and configured to receive an instruction to shut down and/or otherwise adjust power distribution.

Figure 5:
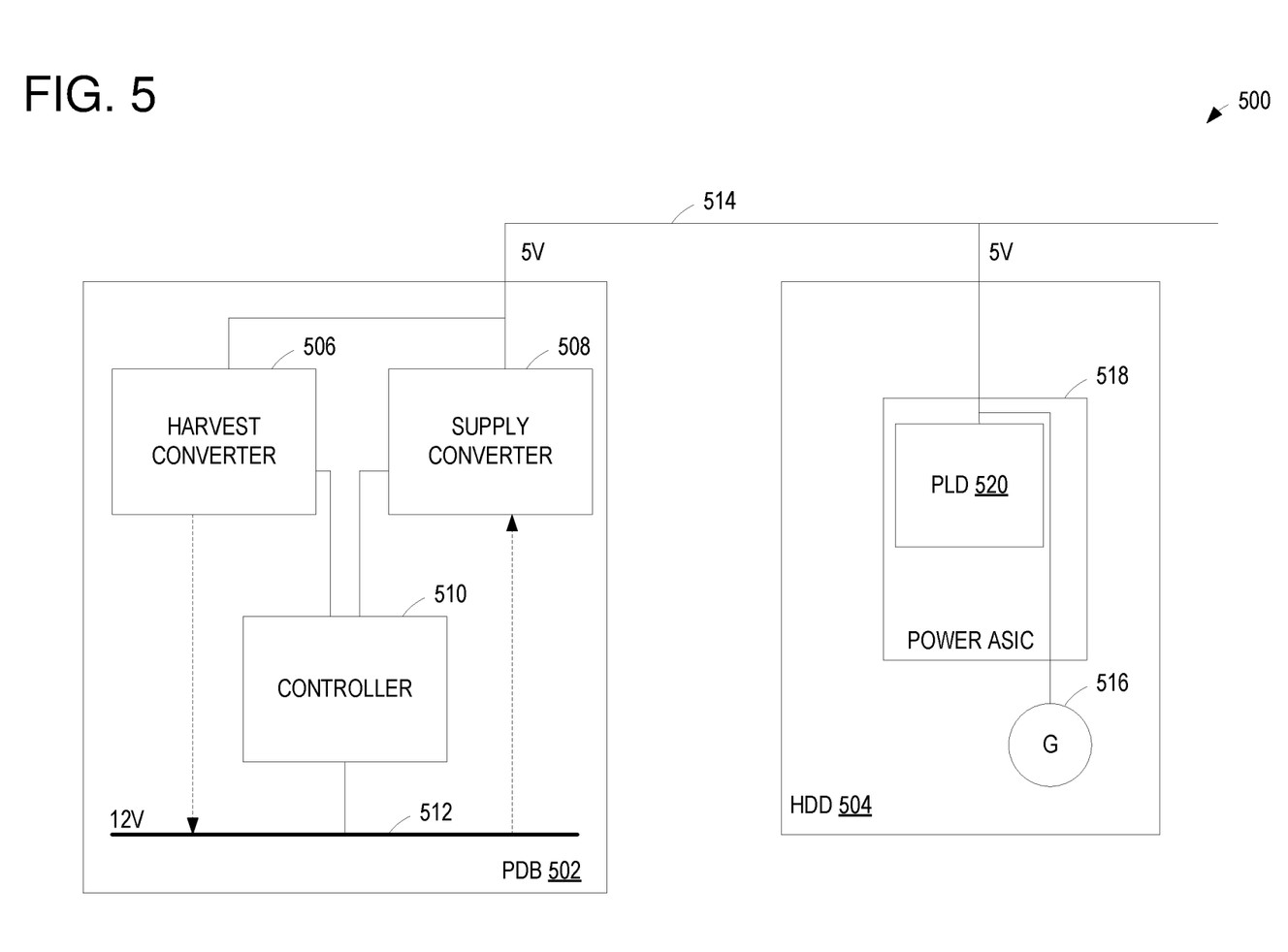
FIG. 5 is an example block diagram of another embodiment for harvesting and propagating energy from hard disk drives to other components of a data storage system.

FIG. 5 shows another example embodiment for harvesting energy from an HDD using a PDB. The diagram in FIG. 5 shows a simplified version of components in a data storage system 500, including a PDB 502 and an HDD 504. However, it is to be understood that the system 500 may include an array of HDDs, racks, and servers, as described above with respect to FIG. 1, as well as one or more of the detailed components of the PDB 106 and the HDD 108a of FIG. 1 in combination with the illustrated components.

The PDB 502 includes a harvest converter 506 and a supply converter 508, each of which are controlled by a controller 510. The supply converter 508 may operate similarly to converters used in other data storage systems, to convert voltage from a voltage supply (e.g., rail 512, which may correspond to an external voltage supply from a power system external to the server in which the PDB 502 is located) to voltage usable by components of the server, such as HDD 504 (and other components, such as fans in the server, additional circuitry, etc.). The voltage provided by the supply converter is represented by 5 V line 514, but understood to include additional voltage lines to additional components.

The PDB 502 also includes a harvest converter, which may be configured to convert voltage received from the HDD 504 via line 514 to voltage useable by other components in the system (which may include the PDB 502 itself). The controller 510 may be configured to control the switch between operating the harvest converter and the supply converter. For example, the controller 510 may control the harvest converter 506 to operate when a voltage drop is detected on the line 514 indicating that a power loss event has occurred and energy is being supplied from the HDD 504. In some examples, the controller 510 may be configured to detect the power loss event directly from the supply line 512 and prepare the converters 506 and 508 to switch operation once the HDD 504 begins supplying power.

The HDD 504 may include components, such as a generator 516, usable to harvest electrical energy from mechanical inertia of moving components of the drive and a power ASIC 518 including a power loss detection circuit 520 to detect power loss on the line 514 and control the HDD to perform a shut down operation and then supply energy (generated by generator 516) to the PDB 502.

Figure 6:
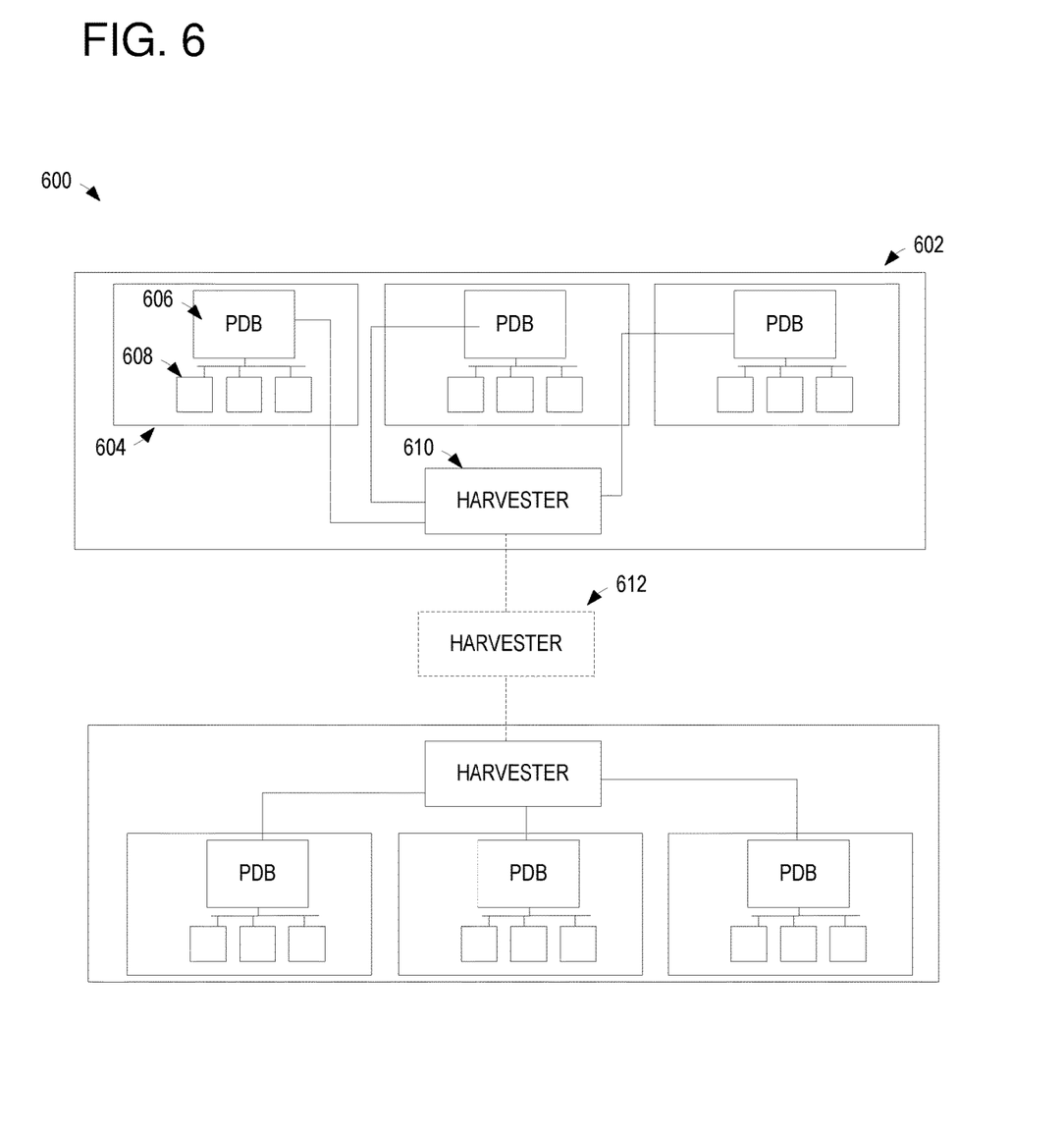
FIG. 6 is an example block diagram of an embodiment for harvesting and propagating energy from hard disk drives to other components of a data storage system using harvesters located outside of servers of the data storage system.

FIG. 6 shows an example system for distributing harvested electrical energy from HDDs to external components in a data storage system. In FIG. 6, a data storage system 600 includes a plurality of racks 602, each including a plurality of servers 604. Each server of each rack includes a corresponding PDB 606 and a plurality of HDDs 608. For example, the PDBs 606 and the HDDs 608 may be configured as described above with respect to PDB 106 and HDD 108*a* of FIG. 1. As described above, the PDBs 106 may be configured to receive electrical energy from the HDDs 108*a* in some conditions, where the electrical energy is harvested from mechanical inertia of moving components of the HDDs.

In some examples, the electrical energy from the HDDs may be used locally within the corresponding server to power other HDDs of that server and/or the PDB of that server. In other examples, the electrical energy from one or more of the HDDs of one server may be used to power HDDs from other servers (within the same rack or a different rack), PDBs from other servers (within the same rack or a different rack), and/or other components (e.g., indicator lights, switches, connected computing equipment such as a connected compute node, etc.) included in and/or connected to the data storage system 600. For example, the data storage system 600 may be a cold storage system, in which HDDs and/or servers are maintained in a powered down state until such time as data access is requested. Accordingly, once one HDD and/or server in the system is powered on then powered off, regenerative power from the recently powered off HDD is distributed to other servers in the rack (e.g., via harvester 610) and/or to other servers in another rack (e.g., via harvester 612).

In order to coordinate the distribution of power between servers and/or other components of the data storage system, each rack 602 may include a harvester 610 that is connected to each PDB of that rack. The harvester 610 may receive the energy from the PDBs (propagated from the HDDs as described above) and convert and distribute the energy as power for other components in the rack or outside the rack. The harvester 610 may include one or more of the above-described components of the PDB 106 of FIG. 1 and/or the PDB 402 of FIG. 4 to perform the energy conversion and distribution.

In additional or alternative examples, a harvester 612 may be positioned between racks (e.g., designated for a group of racks or for all racks of a data storage system) and configured to receive, convert, and distribute energy from the harvesters 610 and/or directly from the PDBs 606 (e.g., in some examples, the harvesters 610 may be replaced by the harvester 612) to other components in or outside of the data storage system 602.

The examples described herein may be used in various data storage environments, including cold storage systems, where mechanical energy from spinning HDDs is converted to electrical energy and then distributed outside of the HDD to other components of the data storage environment. The harvesting and distribution of energy described herein may reduce capacitive element usage in data storage components, such as PDBs, by allowing the harvested energy of HDDs to be used for emergency power by the PDBs as well. The described technologies may also be used to reduce overall power usage in data storage systems and connected devices by directing HDD-harvested power throughout and/or outside of the data storage systems.

Figure 7:
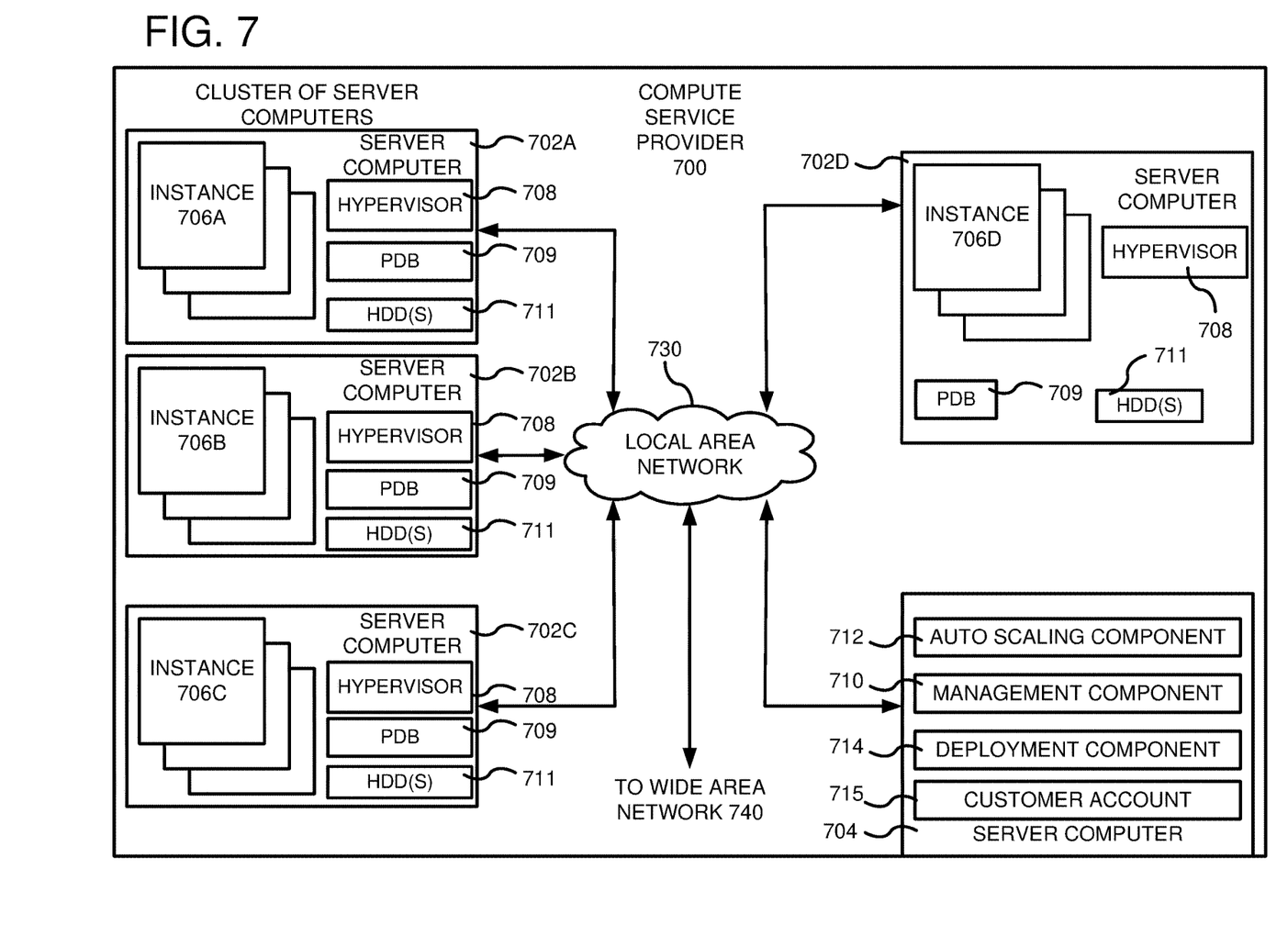
FIG. 7 is an example system diagram showing a plurality of virtual machine instances running in the multi-tenant environment.

FIG. 7 is a computing system diagram of a network-based compute service provider 700 that illustrates one environment in which embodiments described herein can be used. By way of background, the compute service provider 700 (i.e., the cloud provider) is capable of delivery of computing and storage capacity as a service to a community of end recipients. In an example embodiment, the compute service provider can be established for an organization by or on behalf of the organization. That is, the compute service provider 700 may offer a "private cloud environment." In another embodiment, the compute service provider 700 supports a multi-tenant environment, wherein a plurality of clients operate independently (i.e., a public cloud environment). Generally speaking, the compute service provider 700 can provide the following models: Infrastructure as a Service ("IaaS"), Platform as a Service ("PaaS"), and/or Software as a Service ("SaaS"). Other models can be provided. For the IaaS model, the compute service provider 700 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 700 using networked client devices, such as desktop computers, laptops, tablets, smartphones, etc. running web browsers or other lightweight client applications. Those skilled in the art will recognize that the compute service provider 700 can be described as a "cloud" environment.

Services are commonly used in cloud computing. A service is a software function provided at a network address over the web or the cloud. Clients initiate service requests to servers and servers process the requests and return appropriate responses. The client service requests are typically initiated using, for example, an API request. For purposes of simplicity, service requests will be generally described herein as API requests, but it is understood that other service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a service receives the API request from a client device, the service can generate a response to the request and send the response to the endpoint identified in the request.

The particular illustrated compute service provider 700 includes a plurality of server computers 702A-702D. While only four server computers are shown, any number can be used, and large centers can include thousands of server computers. The server computers 702A-702D can provide computing resources for executing software instances 706A-706D. In one embodiment, the instances 706A-706D are virtual machines. As known in the art, a virtual machine is an instance of a software implementation of a machine (i.e. a computer) that executes applications like a physical machine. In the example of virtual machine, each of the servers 702A-702D can be configured to execute a hypervisor 708 or another type of program configured to enable the execution of multiple instances 706 on a single server. Additionally, each of the instances 706 can be configured to execute one or more applications. Each server computer 702 may include a PDB 709, configured to control power distribution throughout the server, and one or more HDDs 711, configured to store data. The PDB 709 may be an example of any of the PDBs described herein, including PDB 106 of FIG. 1 and PDB 206 of FIG. 2. The PDB 709 may be configured to distribute regenerative power from one or more of the HDDs 711 during some operating conditions, as described here (e.g., in accordance with method 400 of FIG. 4).

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 704 can be reserved for executing software components for managing the operation of the server computers 702 and the instances 706. For example, the server computer 704 can execute a management component 710. A client can access the management component 710 to configure various aspects of the operation of the instances 706 purchased by the client. For example, the client can purchase, rent or lease instances and make changes to the configuration of the instances. The client can also specify settings regarding how the purchased instances are to be scaled in response to demand. The management component can further include a policy document to implement client policies. An auto scaling component 712 can scale the instances 706 based upon rules defined by the client. In one embodiment, the auto scaling component 712 allows a client to specify scale-up rules for use in determining when new instances should be instantiated and scale-down rules for use in determining when existing instances should be terminated. The auto scaling component 712 can consist of a number of subcomponents executing on different server computers 702 or other computing devices. The auto scaling component 712 can monitor available computing resources over an internal management network and modify resources available based on need.

A deployment component 714 can be used to assist clients in the deployment of new instances 706 of computing resources. The deployment component can have access to account information associated with the instances, such as who is the owner of the account, credit card information, country of the owner, etc. The deployment component 714 can receive a configuration from a client that includes data describing how new instances 706 should be configured. For example, the configuration can specify one or more applications to be installed in new instances 706, provide scripts and/or other types of code to be executed for configuring new instances 706, provide cache logic specifying how an application cache should be prepared, and other types of information. The deployment component 714 can utilize the client-provided configuration and cache logic to configure, prime, and launch new instances 706. The configuration, cache logic, and other information may be specified by a client using the management component 710 or by providing this information directly to the deployment component 714. The instance manager can be considered part of the deployment component.

Client account information 715 can include any desired information associated with a client of the multi-tenant environment. For example, the client account information can include a unique identifier for a client, a client address, billing information, licensing information, customization parameters for launching instances, scheduling information, auto-scaling parameters, previous IP addresses used to access the account, etc.

A network 730 can be utilized to interconnect the server computers 702A-702D and the server computer 704. The network 730 can be a local area network (LAN) and can be connected to a Wide Area Network (WAN) 740 so that end users can access the compute service provider 700. It should be appreciated that the network topology illustrated in FIG. 7 has been simplified and that many more networks and networking devices can be utilized to interconnect the various computing systems disclosed herein.

Figure 8:
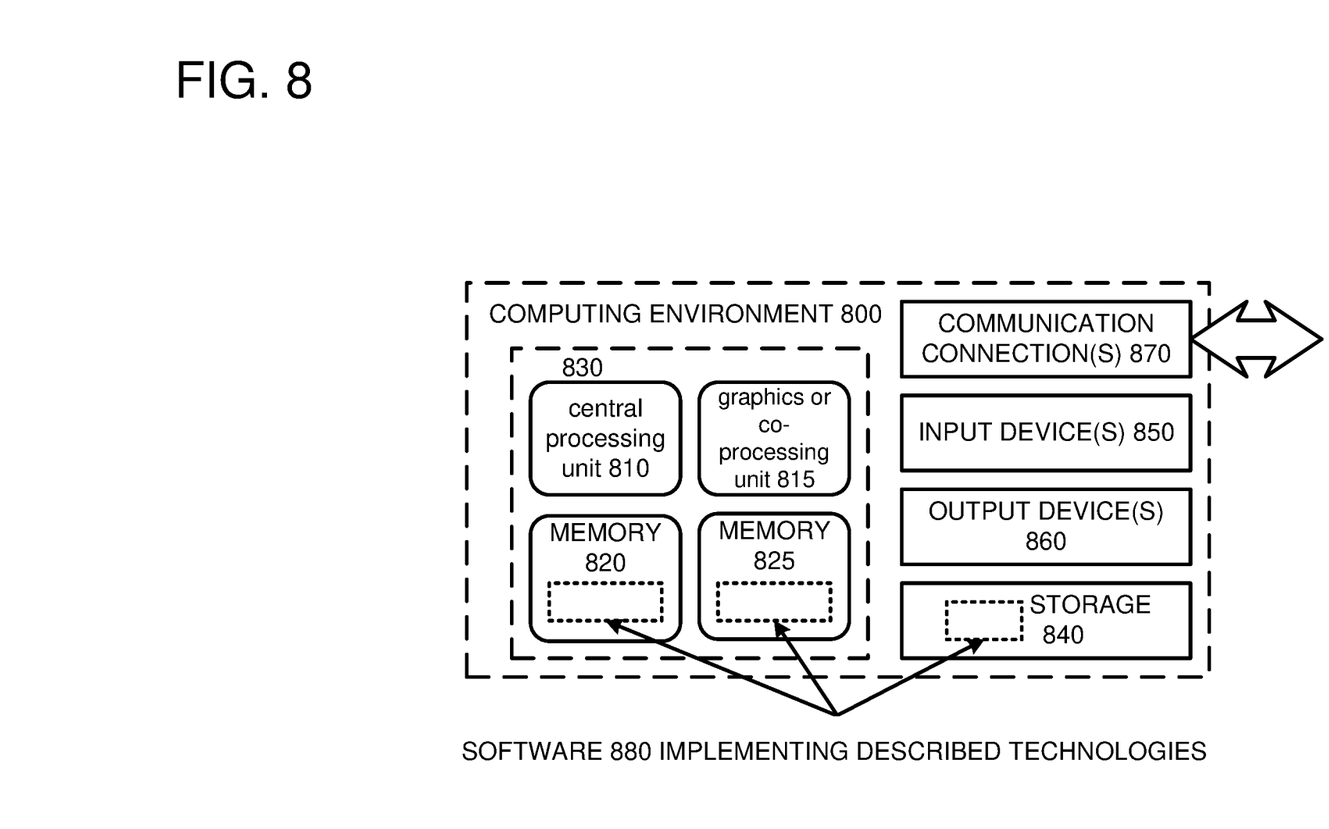
FIG. 8 depicts a generalized example of a suitable computing environment in which the described innovations may be implemented.

FIG. 8 depicts a generalized example of a suitable computing environment 800 in which the described innovations may be implemented. For example, the computing environment 800 may be an example of a computing environment in which the racks 102, servers 104, and/or HDDs 108 of FIG. 1 and/or other services, modules, and/or devices described herein are implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A hard disk drive (HDD), comprising:
    a generator configured to convert mechanical energy of moving components of the HDD to electrical energy; and
    a power logic module coupled to the generator and configured to control power distribution for the HDD by:
    maintaining a load control signal at a first logical level and routing electrical energy from a power distribution board (PDB) of a data storage system to additional components of the HDD, and
    responsive to detection of an HDD shut down operation, setting the load control signal to a second logical level and routing the electrical energy from the generator to the PDB.

2. The HDD of claim 1, wherein the power logic module includes a power application-specific integrated circuit (ASIC).

3. The HDD of claim 1, further comprising a first load switch having an input coupled to the PDB via a supply voltage line and an output coupled to a first voltage supply line of the power logic module, and a second load switch having an output coupled to the PDB and an input coupled to a second voltage supply line of the power logic module, wherein the voltage of the second voltage supply line is supplied by the generator, and wherein the first and second load switches are selectively enabled based on the load control signal, the load control signal enabling the second load switch and disabling the first load switch when set to the second logical level, and wherein the power logic module is configured to set the load switch to the second logical level responsive to detection of a voltage drop below a threshold indicative of a power loss event.

4. The HDD of claim 3, further comprising a third load switch having an input coupled to the second voltage supply line and an output coupled to the additional HDD components, wherein the third load switch is enabled when the load control signal is set to the first logical level.

5. The HDD of claim 3, wherein the second load switch is coupled to the PDB via a connecting pin of a data connector, and wherein the electrical energy from the generator is provided to the PDB via the connecting pin when the second load switch is enabled.

6. The HDD of claim 1, wherein the HDD shut down operation is powered using the electrical energy from the generator.

7. The HDD of claim 6, wherein the HDD shut down operation is triggered responsive to detection of a voltage drop on the supply voltage line that is above a threshold.

8. The HDD of claim 7, further comprising an HDD controller configured to perform the HDD shut down operation, wherein the HDD shut down operation is triggered by sending a first signal from the power logic module to the HDD controller, and wherein the load control signal is set to the second logical level responsive to the power logic module receiving a second signal from the HDD controller indicating that the HDD shut down operation has completed.

* * * * *